Sept. 15, 1931.  B. A. GUY  1,823,397
LEVEL INDICATOR ADAPTED CHIEFLY FOR HIGH PRESSURE BOILERS
Filed May 16, 1927  2 Sheets-Sheet 1

B. A. Guy
INVENTOR

By Marks & Clerk
Attys.

Sept. 15, 1931. B. A. GUY 1,823,397
LEVEL INDICATOR ADAPTED CHIEFLY FOR HIGH PRESSURE BOILERS
Filed May 16, 1927 2 Sheets-Sheet 2
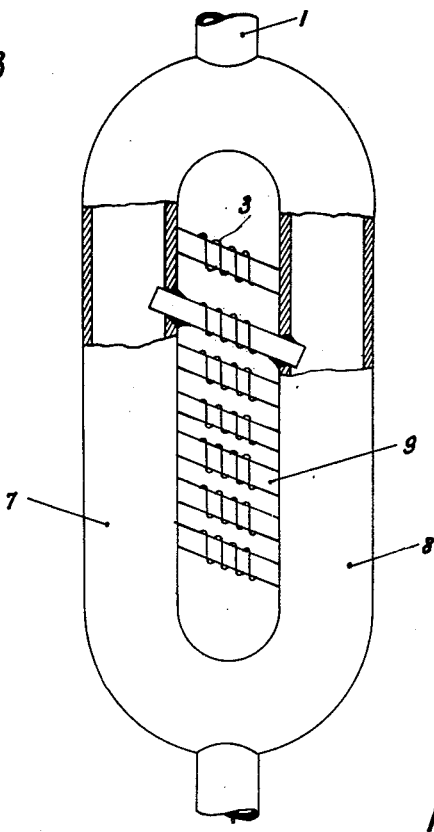
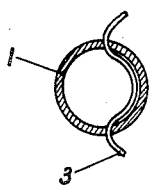
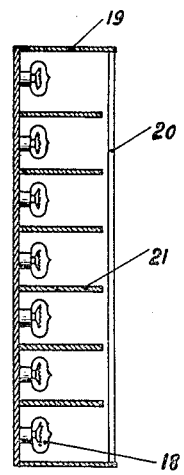
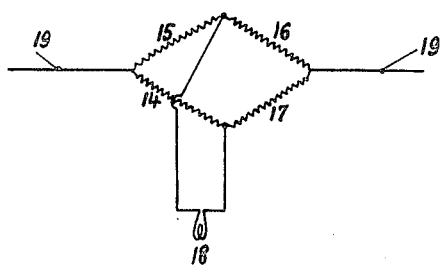

Patented Sept. 15, 1931

1,823,397

UNITED STATES PATENT OFFICE

BENJAMIN ALFRED GUY, OF PARIS, FRANCE

LEVEL INDICATOR ADAPTED CHIEFLY FOR HIGH PRESSURE BOILERS

Application filed May 16, 1927, Serial No. 191,909, and in France May 26, 1926.

My invention relates to an entirely metallic level indicator showing no transparent breakable part and requiring no mechanical arrangement nor any electric contact whereby it works with the greatest reliability and safety even with high pressure boilers.

This apparatus gives out the water level through the different effect obtained by heating (preferably through electricity) the outside of a metal wall, according as to whether the inside of the wall bathes in water or in steam. In view of this I dispose at varying heights, along the wall of a tube connected with the boiler, a number of electrically heated wires or sections of the same wire, each provided with an indicating device sensitive to changes in temperature. This device can be executed in a great number of different manners of which some provide for distance indications, if desired.

On appended drawings:

Fig. 3 illustrates a special form of execution of a tube over which are disposed electrically resistant wires.

Fig. 6 is a cross-section of a modified form of execution.

Fig. 7 shows diagrammatically a fifth form of execution.

Fig. 8 illustrates a particularly interesting arrangement of the indicating lamps.

Figure 1:
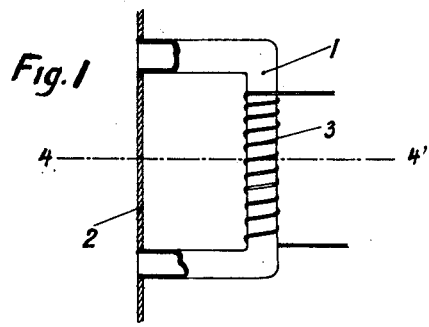
Fig. 1 is a partly sectional side view of a first form of execution of my invention.

In the form of execution shown on Fig. 1 a metallic tube 1 is connected with the boiler 2 in the same manner as the usual level indicators constituted by glass tubes; it is covered on its outside by a suitably insulated wire winding 3 showing a suitable electric resistance. The wire may be for instance wound helically or disposed in a zig-zag or straight line along the tube, for instance parallel to the axis thereof. In all cases the wire must bear tightly against the tube so as to ensure a proper calorific exchange between the said tube and wire. A constant current is sent through the wire, its intensity being such as will cause the wire to be incandescent above the water level 4—4'. The part below this level gives its heat off to the water behind the corresponding portion of the wall of the tube and cannot remain incandescent. The point where the incandescence begins indicates therefore the level of the water.

Figure 2:
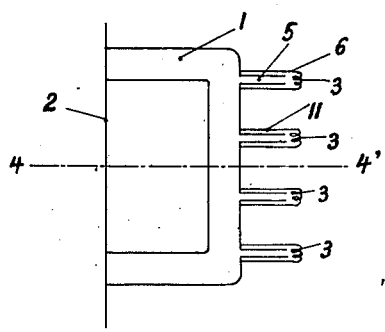
Fig. 2 shows a similar view of a second form of execution.

Fig. 2 shows a tube having a slightly different shape. It is provided with a certain number of secondary horizontal branches or parts of tubes 5 which communicate through one end with the main tube 1, the other end being closed by the flat bottom plate 6. Resistant wire elements 3 such as those shown on Fig. 1 are insulated through preferably transparent material such as glass, quartz, mica or the like and are disposed against these bottom plates. The working is the same as in the precedent case with the advantage of allowing an easier replacement of the resistance. The tubular portions 5 may be slightly conical in order to make their emptying speedier.

The tube 1 can also be given the shape shown on Fig. 3 and consist of two vertical arms 7 and 8 connected at their lower part and communicating through a series of tubes which are preferably sloping in view of facilitating their emptying. It is these tubes which bear the heating filaments 3.

Figure 4:
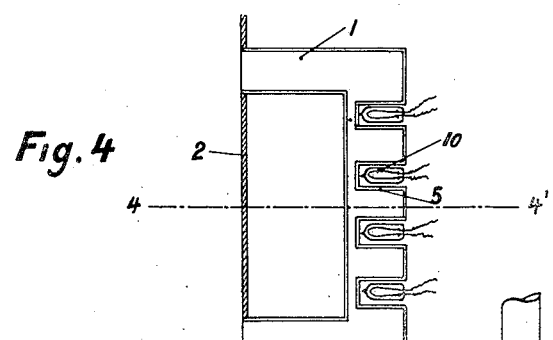
Fig. 4 is a view similar to Fig. 2 of a third form of execution.

Fig. 4 shows another form of execution wherein the tubular horizontal portions 5 are provided each with an inner longitudinal recess opening into the atmosphere and wherein is lodged an incandescent gas filled bulb 10 (preferably filled with nitrogen). The calorific exchange between the incandescent resistance of the lamp and the water provides the same results as in the precedent case. Only the lamps disposed above the water level retain their normal illuminating power. Colored glass may be used for the bulbs in view of absorbing the red light emitted by the lower bulbs and of allowing the violet rays of the top lamps to pass in view of making the difference between the upper and lower bulbs still more apparent.

The temperature of the filament may be indicated by any suitable device instead of by its incandescence such as by a pyrometer or a thermometer.

For instance a melting pyrometric device may be used. In view of this a transparent receiver disposed near the filament is filled with a suitable substance the appearance of which changes according as to whether it is solid or liquid. In the case of Fig. 2 for instance round each tubular portion 3 is disposed a glass tube 11 whereby an annular hermetically closed space is arranged between the said glass tube and the tubular portion 3. This space is filled with a substance such as a suitable salt which has a different appearance according as to whether it is solid or liquid and the size of the different parts is devised so as to cause the substance to melt under the action of the corresponding resistance when the latter is not cooled by the water contained in the adjacent tubular portion.

Other pyrometric devices could of course be used (substances liable to change color, thermoelectric elements and the like). Pyrometric devices based on the variation of the ohmic resistance of the filament at different temperatures are worthy of a special mention in this connection.

Figure 5:
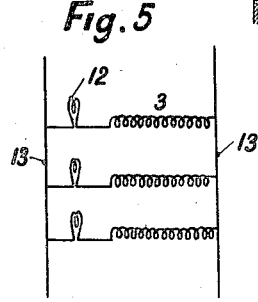
Fig. 5 shows diagrammatically a fourth form of execution.
Figure 10:
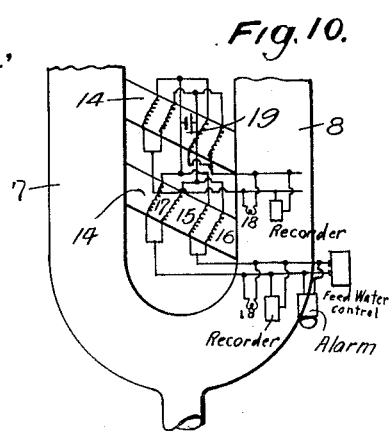
Fig. 10 shows a level gauge similar to that shown in Fig. 3 to which the connections of Fig. 7 have been applied.

Thus the heating filaments 3 shown on Fig. 2 may be constituted by a wire of metal having a resistance which increases with the temperature (nickel, iron, and the like) and connected together as shown on Fig. 5; each filament 3 inserted in series with a witness lamp 12 is connected with a current supply 13 having a constant voltage. The lamps 12 connected with the windings above water level will be dimmed because their resistance will be greater due to their being not cooled and the current passing through them and the lamps will be consequently diminished. On the contrary the lamps corresponding to the part under water will retain their complete brilliancy.

If desired the modified form shown on Fig. 6 may be used in view of ensuring a better calorific exchange in which case the wire having a variable ohmic resistance passes inside the tube.

The lamps instead of being inserted in series as shown on Fig. 5 with portions of wire having a resistance which varies with the temperature, may be connected in any other suitable manner. Fig. 7 shows a Wheatstone bridge arrangement which gives good results. On each tube 4 is disposed instead of one filament 3 four filaments 14, 15, 16, 17 of which 15 and 17 are made of metal such as iron or nickel the resistance of which varies with the temperature and 14 and 16 are made of metal such as "constantan" metal showing a constant or substantially constant resistance at all temperatures. The lamp 18 is inserted in the bridge proper. The wires 19, 19 are connected in series or parallel with the current supply. The four resistances completing the Wheatstone bridge are chosen such as will cause the bridge to be in equilibrium when the corresponding tube is empty, the lamp being then extinguished as no current passes through 7. On the contrary when the tube is full of water, the lamp is illuminated as the filaments 15 and 17 having a lower resistance, the bridge is no more in equilibrium.

The four resistances 14, 15, 16 and 17 may be constituted by the same metal having a varying resistance provided the two wires 14 and 16 are disposed below the two resistances 15 and 17 whereby if the water level is between these two series of resistances, the Wheatstone bridge is no more equilibrated whereas if the level is above (or below) both series, the bridge is equilibrated.

It is possible also to use colored lamps at both ends of the arrangement so as to draw the attention of the attendants.

Of course the lamps may be disposed either near the liquid level or else at some distance for instance in a director's or an engineer's office. Such lamps may be disposed (Fig. 8) in a vertical box 19 the front wall 20 of which is of ground glass. The lamps are separated from each other through opaque partitions 21 which stop a few millimeters short of the wall 20 so that when two following lamps are illuminated the illumination of the plate 19 seems continuous between the two lamps. A blue ground glass may be used so as to recall the appearance of water. The optical indications described hereinbefore may be completed by an acoustic alarm signal actuated by one of the pyrometric devices i. e. one of the devices responsive to the difference of temperature due to the water having risen beyond a given level. This may be provided by a thermoelectric device producing a current which actuates a bell, directly or through a relay. This pyrometric device may comprise a Wheatstone bridge as described hereinbefore, the bell being inserted in the bridge itself instead of or together with the lamp 18. Instead of a bell, a vibrator may be used which is in harmony with the number of periods of the feeding A. C. A very reliable apparatus is thus made up which comprises no electric contact.

The lamp illuminating arrangement may be completed by an automatic recorder comprising a moving paper band. The pyrometric devices each act directly or through a relay on an inked stylus which they bring near the paper whereby the exact level of the water is given at each moment.

The pyrometric devices may also be used for adjusting at a distance through relays the feeding of the boiler.

The principle underlying my invention may also be used in a somewhat different manner: the wire having a resistance varying with the temperature may be wound over a vertical steel tube connected with the boiler like an ordinary level indicating tube; this resistance is inserted in series with a measuring apparatus such as an ammeter for instance or is used in combination with a Wheatstone bridge or the like. Evidently the current passing through the measuring apparatus or through the bridge varies according to the water level whereby the said apparatus or bridge may be graduated in water level heights. It is preferable to insert in series with the wire (or each element of the wire if they are fed in parallel) a witness apparatus, preferably a lamp to show the corresponding resistance is in proper working order.

Figure 9:
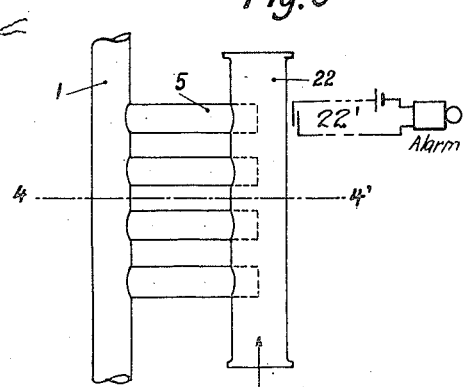
Fig. 9 is a side view of a sixth form of execution.

Finally instead of using electric heating any other heat supply may be used such as a flame or a current of hot gases from the boiler furnace, of which a small part is shunted so as to pass near the level indicator. In view of using such heat supplies, I may (Fig. 9) dispose horizontally and secure by welding or otherwise a number of horizontal tubes 5 or of solid metal rods on the tube 1. The ends of these tubes or rods are heated in a tube 22 containing the flame or the gases the direction of flow of which is illustrated by an arrow so that the tubes or rods 5 disposed above the water level will be much hotter than those cooled by the water. Any suitable pyrometric devices such as 22' may be disposed on these tubes or rods as explained hereinbefore. However a difference of temperature may be sufficiently detected by the different aspect of these parts especially if some are red hot and the others dull. Eventually instead of being a heating tube the tube 22 might be refrigerating and be air or water cooled.

The exchange of heat though in the reverse direction will create a difference in the temperature of the different rods or tubes 5 and this difference will be made apparent by any suitable pyrometric device.

What I claim is:

1. A level indicator chiefly for water boilers comprising a substantially vertical container connected with the boiler, a wall of said container the inside of which is bathed by water or steam from the boiler according to the height of the point considered, a series of heat sensitive elements disposed at different heights in heat exchanging contact with the outside of said wall, a supply of energy, means whereby said supply heats the several elements above the highest temperature of the wall at any point and temperature revealing means corresponding to each element.

2. A level indicator chiefly for water boilers comprising a substantially vertical part, a series of lateral tubes borne by said part and the inside of which is bathed by water or steam from the boiler according to the height of the tube considered, a series of heat sensitive elements disposed at different heights in heat exchanging contact with the outside of each tube, a supply of energy, means whereby said supply heats the several elements above the highest temperature of any tube and temperature revealing means corresponding to each element.

3. A level indicator chiefly for water boilers comprising an O-shaped tube disposed in a substantially vertical plane, a series of slightly sloping lateral tubes connecting the two arms of said O-shaped tube and the inside of which is bathed by water or steam from the boiler according to the height of the lateral tube considered, a series of elements disposed at different heights in contact with the outside of each tube, a supply of energy, means whereby said supply heats the several elements above the highest temperature of any tube and temperature revealing means corresponding to each element.

4. A level indicator chiefly for water boilers comprising a substantially vertical container connected with the boiler, a wall of said container the inside of which is bathed by water or steam from the boiler according to the height of the point considered, a series of wires disposed at different heights in heat exchanging contact with the outside of said wall, an electric supply, means whereby said supply heats the several wires above the highest temperature of the wall at any point and temperature revealing means corresponding to each elemental wire.

5. A level indicator chiefly for water boilers comprising a substantially vertical container connected with the boiler, a wall of said container the inside of which is bathed by water or steam from the boiler according to the height of the point considered, a series of heat sensitive wires, the resistivity of which varies with the temperature disposed at different heights in heat exchanging contact with the outside of said wall, an electric supply, means whereby said supply heats the several wires above the highest temperature of the wall at any point and temperature revealing means connected with each elemental wire.

6. In a level indicator as claimed in claim 1 the provision of independent level indicating means controlled by the temperature revealing means.

In testimony whereof I have affixed my signature.

BENJAMIN ALFRED GUY.